No. 886,982.

PATENTED MAY 5, 1908.

J. W. ISLER.
COMPUTING CHEESE CUTTER.
APPLICATION FILED AUG. 29, 1907.

2 SHEETS—SHEET 1.

WITNESSES
E. G. Bromley,
Walton Harrison

INVENTOR
John Williams Isler
BY
ATTORNEYS

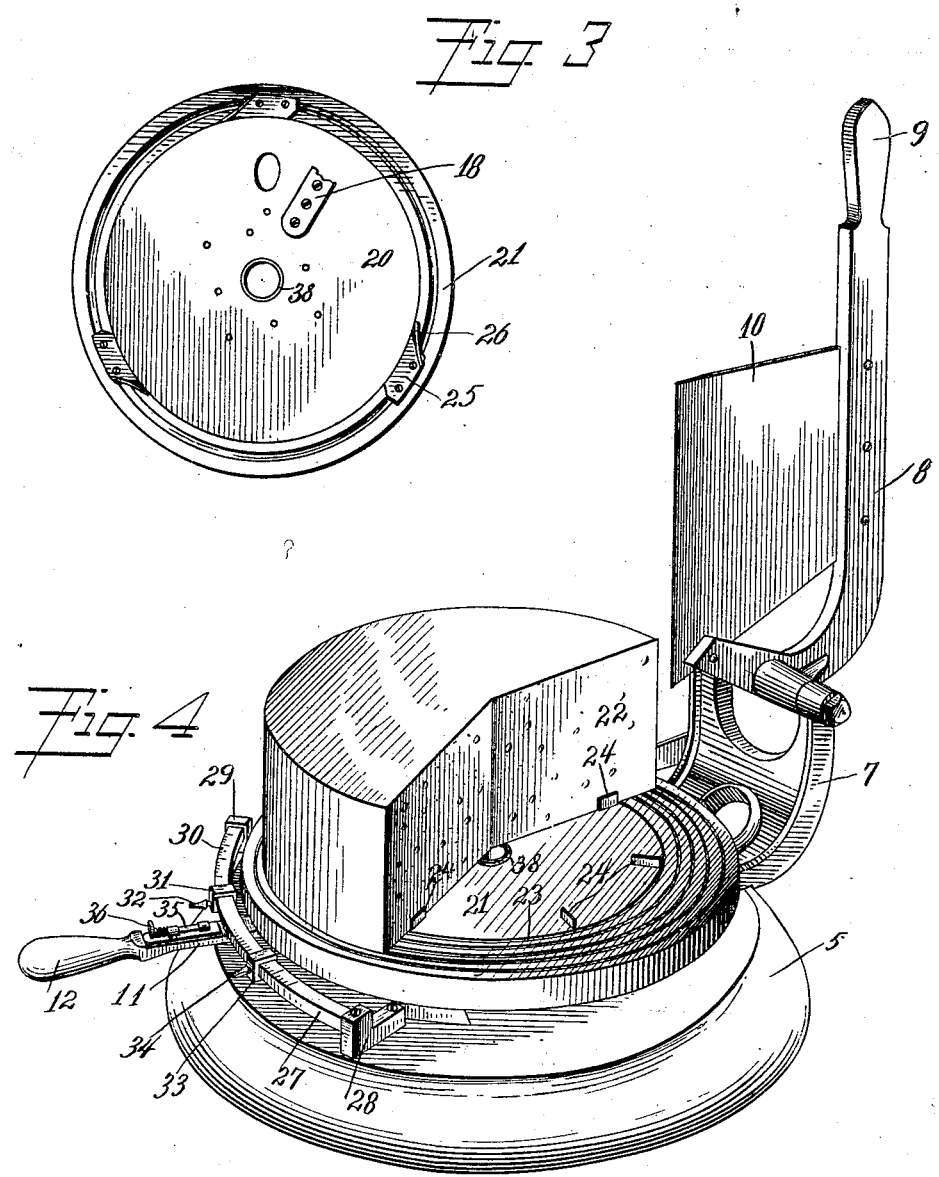

UNITED STATES PATENT OFFICE.

JOHN WILLIAMS ISLER, OF GOLDSBORO, NORTH CAROLINA.

COMPUTING CHEESE-CUTTER.

No. 886,982.    Specification of Letters Patent.    Patented May 5, 1908.

Application filed August 29, 1907. Serial No. 390,569.

*To all whom it may concern:*

Be it known that I, JOHN WILLIAMS ISLER, a citizen of the United States, and a resident of Goldsboro, in the county of Wayne and State of North Carolina, have invented a new and Improved Computing Cheese-Cutter, of which the following is a full, clear, and exact description.

My invention relates to cutters for cheese and analogous substances, my more particular purpose being to provide a construction enabling the operator to sever a precise predetermined amount of the cheese or other article to be cut, and also, if desired, to automatically compute the price of the piece to be severed.

Reference is to be had to the accompanying drawings forming a part of this specification, in which similar characters of reference indicate corresponding parts in all the figures.

Figure 1:
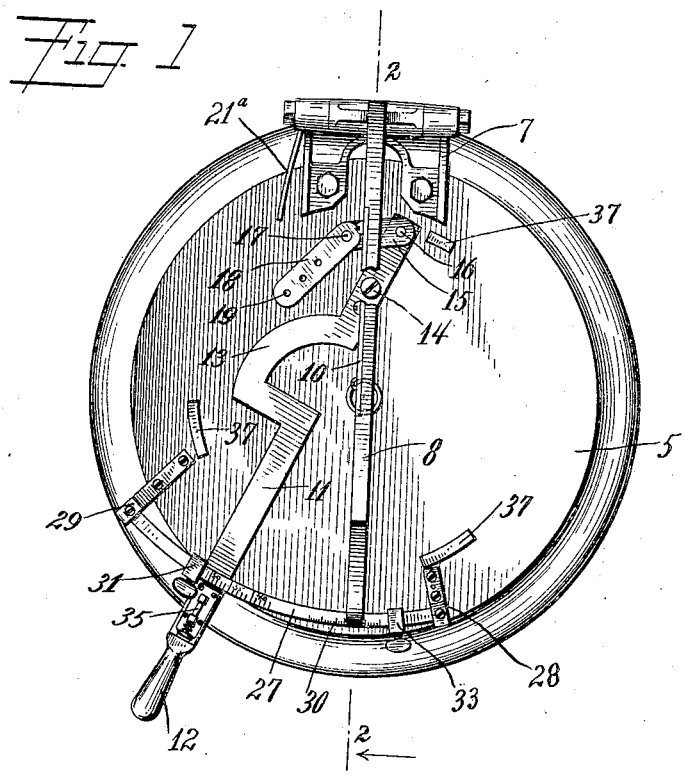
Figure 2:
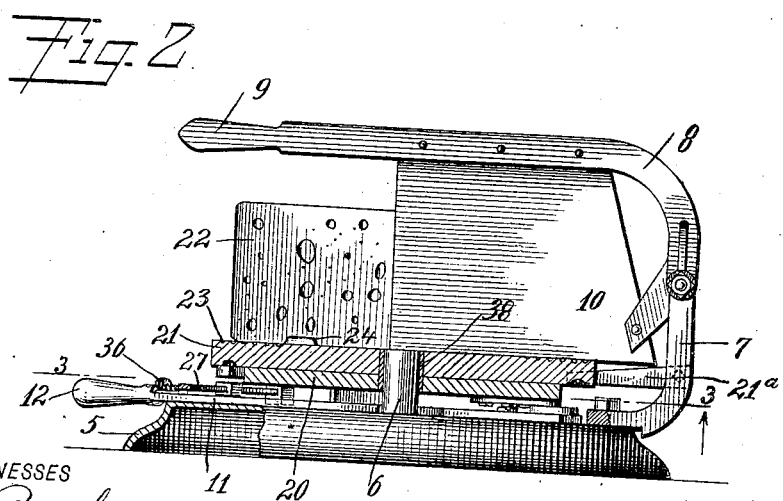

Figure 1 is a plan view of the lower portion of the cutter, the cheese board having been removed, this view showing the lever for manipulating the lever board and also showing the gage and its accompanying parts in relation to the lever; Fig. 2 is a substantially central vertical section through the cheese cutter on the line 2—2 in Fig. 1, showing the relations of the cheese board, the lever board supporting the cheese board and used for actuating the same step by step, and the lever and its parts for actuating the lever board; Fig. 3 is an inverted plan view of the lever board and the cheese board, substantially on the line 3—3 in Fig. 2, this view showing how the two boards just mentioned are connected together; and Fig. 4 is a perspective showing the cheese cutter complete and ready for action.

A base 5 is provided centrally with a pivot 6, and mounted upon the base is a stationary bracket 7. Pivoted to this bracket is a cheese knife 8 provided with a handle 9 and a blade 10. A lever 11 is provided with a handle 12 and with a bend 13, to prevent interference between the lever and the pivot 6. The lever is mounted upon the base 5 by aid of a pivot pin 14. A link 15 is connected by a pivot 16 with the short end of the lever and is connected by a pivot 17 with a plate 18. This plate is provided with screw holes 19 by aid of which it is secured rigidly against the under side of a circular board 20. For convenience I designate this board 20 as the "lever board."

Resting upon the lever board 20 is a circular board 21 which I call the "cheese board", as it supports the cheese 22. The cheese board is provided with concentric rings 23, serving as markers or indices for the purpose of centering and otherwise locating the cheese. The cheese board 21 is further provided with lugs 24 disposed radially, as indicated in Fig. 4, and adapted to extend slightly into the under face of the cheese. By this means the cheese is held rigidly in relation to the cheese board whereby it is supported.

A number of arcuate lugs 25 are mounted rigidly upon the under side of the cheese board 21, and fit snugly, but not tightly, against the outer peripheral edge of the lever board 20. Each lug 25 is provided with a spring pawl 26 which engages directly the peripheral surface of the lever board 20. The arrangement of the spring pawls 26 is such that when the lever board 20 is moved in a clockwise direction, according to Fig. 3, the rotation of the lever board 20 causes rotation of the cheese board 21 at the same rate of speed, whereas rotation of the cheese board 20 in a contraclockwise direction, according to Fig. 3, has little or no tendency to rotate the cheese board 21.

Mounted upon the bracket 7 is a spring pawl 21ª which engages the peripheral surface of the cheese board 21. This pawl permits free rotation of the cheese board in one direction but not in the opposite direction. An arcuate scale 27 is supported upon lugs 28, 29 and is provided with graduations 30. A bracket 31 is slidably mounted upon the scale 27 and is provided with a thumb screw 32, whereby its position, relative to the scale may be altered at will. This bracket 31 extends down low enough to serve as a limiting stop for the lever 11. The operator, by aid of the thumb screw 32, can move the bracket 31 to any desired point along the scale 27, and then fasten the bracket 31. He can now swing the lever 11 around by hand until it reaches the bracket 31, and is thus brought to a stop. Another bracket 33 is slidably mounted upon the scale 27 and is provided with a thumb screw 34. This bracket is similar in construction to the bracket 31, except that its bottom does not extend quite so far below the lower edge of the scale 27. The result is that the lever 11 can always pass under the bracket 33 but never under the bracket 31.

Mounted upon the lever 11 is a spring pawl 35 provided with a thumb piece 36, whereby it may be temporarily pressed inward; that is, toward the center of the machine. Spacing blocks 37 are mounted upon the base 5 and are used to insure a sufficiency of room for the lever and other parts connected therewith. A metallic sleeve 38 is rigidly connected with the lever board 20 and projects upwardly therefrom. This sleeve is concentric with the pivot 6 and serves as a pivot for the cheese board 21. When the hand lever 11 is given a reciprocating swinging motion by aid of the handle 12, the base 5 remains stationary and the lever board 20 rocks upon the pivot 6. The angular motion of the lever board, however, is less than that of the lever 11. This is for the purpose of giving the movement of the lever a relatively long swing, so as to insure accuracy. The cheese board 21 has no rocking movement like the lever board 20, but rather a step-by-step movement, the degree of which is dependent upon the stroke of the lever 11 and this, as above explained, may be changed at will.

When the lever 11 is moved to the left, according to Fig. 1, the edge of the lever board 20 next to the operator is moved to his left, the cheese board 21 remaining stationary. When, however, the lever 11 is moved by the operator to his right, the adjacent edge of the lever board 20 moves to the right and so also does the adjacent edge of the cheese board 21. In other words, both the lever board 20 and the cheese board 21 turns as a unit to the right, both following the motion of the hand lever 11 but moving more slowly than the same, and when the hand lever is moved toward the left, the cheese board 21 remains for the moment stationary. The movement may be readily understood by considering that the lever board 20 moves the cheese board 21 in the same sense that a reciprocating pawl moves a ratchet wheel, and retrograde motion of the cheese board 21 is prevented by the spring pawl 21$^a$ so that the cheese board 21 moves in but one direction.

The operation of my device is as follows: The cheese is placed upon the cheese board 21 and centered as above described, being anchored securely in position by aid of the lugs 24. The operator now makes a cut down into the cheese by aid of the cheese knife, in the usual manner. Suppose, now, that he wishes to arrange the device so that he can cut off pieces of the selling value of five cents. He determines upon the maximum thickness of the slice to be sold for the amount in question, and sets the bracket 33 accordingly. Then, in order to cut five cents' worth, he moves the lever 12 to the right until it is stopped by the bracket 28. He next places his thumb upon the thumbpiece 36 and moves the spring pawl 35 inward, or toward the center of the machine. Holding the pawl in this position, he next moves the lever 11 to the left until the inner end of the pawl is stopped by the bracket 33. In doing this, neither the cheese nor the cheese board has been moved, though the lever board has been moved a distance small as compared with the swing of the lever 11. The operator next presses the lever 11 back to the right against the lug 28 and now makes another cut with the cheese knife. The piece thus severed is of the desired thickness to contain the amount he wishes to sell for five cents. The operator can now move the slide 31 into such position that its distance from the lug 28 will represent the size of a slice weighing say one pound. Fixing the slide 29 at the desired point on the scale selected for this purpose, the operator can, by swinging the hand lever back and forth between its limits, and manipulating the cheese knife after each complete or double movement of the lever, cut off rapidly in succession slices weighing exactly one pound or having any other predetermined weight.

I find it convenient to use the slide 33 for measuring off so many cents worth of cheese less than one pound, and to employ the slide 31 for measuring off one pound, the slide 31 being moved, however, to any desired part of the scale whenever cuts of other sizes are to be made. In the majority of cases a purchaser desires either a pound or so many cents worth of cheese less than a pound.

Suppose the entire cheese weighs thirty pounds. In this case we may set the slide 31 in such position upon the scale that the hand lever, when lodging against it, will so rest relatively to the scale as to indicate the number 30. One stroke of the lever will now measure off exactly a pound. Then, without changing the slide 31 I can shift the lever around, make another measurement and cut off five cents' worth of cheese, this being done by aid of the slide 28. In order to set the slide 28 in proper position to measure off five cents' worth, we multiply the weight of the cheese, say 30, by the price we desire to sell it at per pound, say 20¢. The result is $6. Dividing this by the 5¢ we have 120 which is the number of five cent pieces contained in this particular cheese. We therefore should set the right-hand slide upon that part of the scale bearing the number 120, and the slide is then in position to measure off five cents' worth at a stroke. To make cuts of ten cents each, we would set the slide 28 upon the number 60. It will thus be seen that by moving the slides 28—31 into various positions, the device can be adjusted for cutting off cheese slices rapidly and of predetermined weights.

Having thus described my invention, I claim as new and desire to secure by Letters Patent:

1. The combination of a revoluble board, means for turning the same back and forth, a second board mounted upon said revoluble board, mechanism connected with said first-mentioned board and engaging said second-mentioned board for preventing retrogression of the latter, means for indicating the degree of movement made by the second-mentioned board, and a cutting member for cutting an article resting upon said second-mentioned board.

2. In a cutter, the combination of a base, a revoluble member mounted thereupon and adapted to rock within predetermined limits, a board mounted upon said revoluble member and adapted to turn in one direction, means for preventing retrogression of said board, mechanism for indicating the degree of movement of said board, and a cutting member for severing an article resting upon said board.

3. In a cutter, the combination of a base, a lever pivoted thereupon and movable in relation thereto, a lever board disposed adjacent to said lever, a connection from said lever to said lever board to enable said lever board to rock by movements of said lever, a cheese board journaled upon said base, pawls mounted upon said lever board and engaging said cheese board for the purpose of turning the latter, means for preventing retrogression of said cheese board, means controllable at will for adjusting the degree of play allowed said lever, and a cutting member disposed adjacent to said cheese board for the purpose of severing a cheese thereupon.

4. The combination of a base, a board mounted thereupon and revoluble step by step, a revoluble cheese board, connections from said first-mentioned revoluble board to said cheese board for turning the latter, means for indicating the degree of travel of said cheese board, and a cutting member disposed adjacent to said cheese board and so positioned as to cut always in the same plane.

5. In a cheese cutter, the combination of a revoluble cheese board, a knife movable in relation thereto in a plane crossing the general direction of travel of said cheese board, means provided with a lever for actuating said cheese board step by step, a pawl movably mounted upon said lever, a gage of arcuate form disposed adjacent to said lever and to said pawl, a bracket mounted upon said gage and provided with a portion to be engaged by said pawl so as to form a limiting stop therefor, and means for shifting the position of said bracket relatively to said gage.

In testimony whereof I have signed my name to this specification in the presence of two subscribing witnesses.

JOHN WILLIAMS ISLER.

Witnesses:
F. M. MAYE,
JNO. W. LASSER.